Jan. 24, 1956   R. E. DEEBEL   2,732,224
SELF LATCHING BALL AND SOCKET TYPE COUPLING
Filed April 29, 1955   2 Sheets-Sheet 1
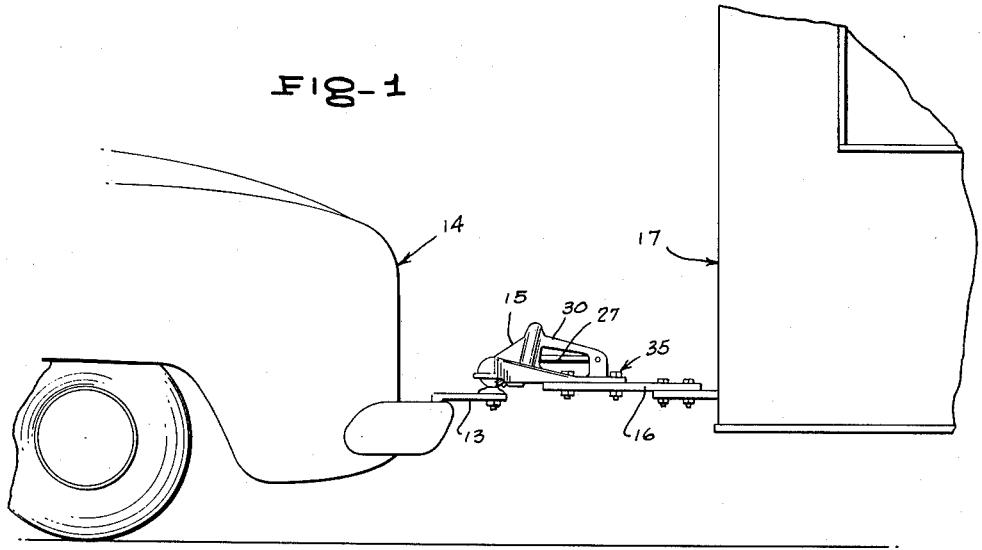
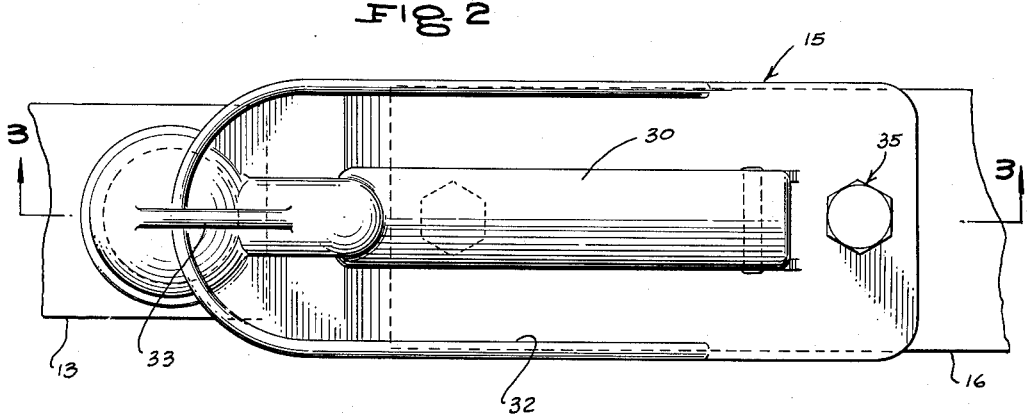
INVENTOR.
ROBERT E. DEEBEL
BY
McMorrow, Berman + Davidson
ATTORNEYS Jan. 24, 1956 R. E. DEEBEL 2,732,224
SELF LATCHING BALL AND SOCKET TYPE COUPLING
Filed April 29, 1955 2 Sheets-Sheet 2
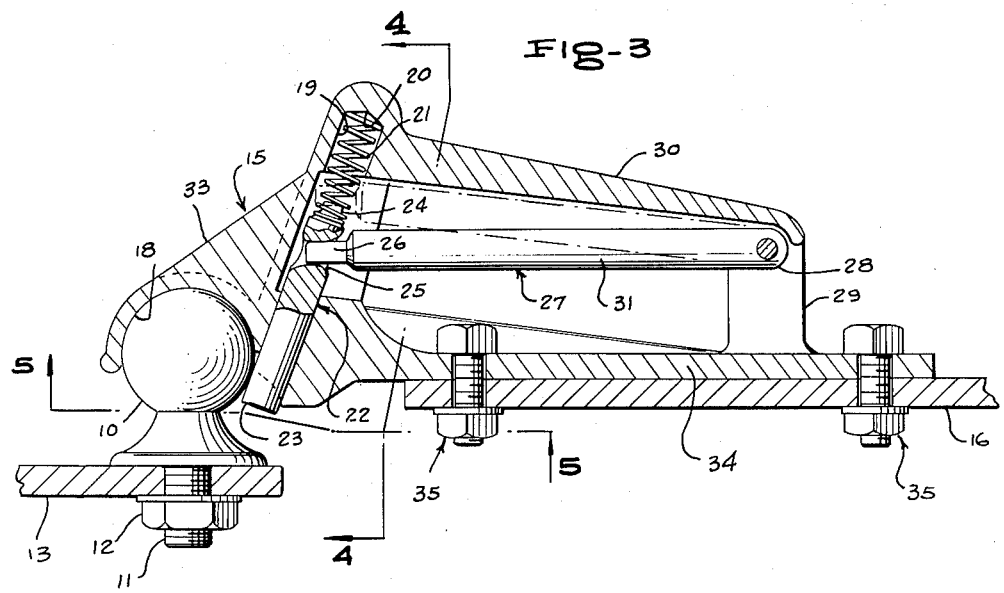
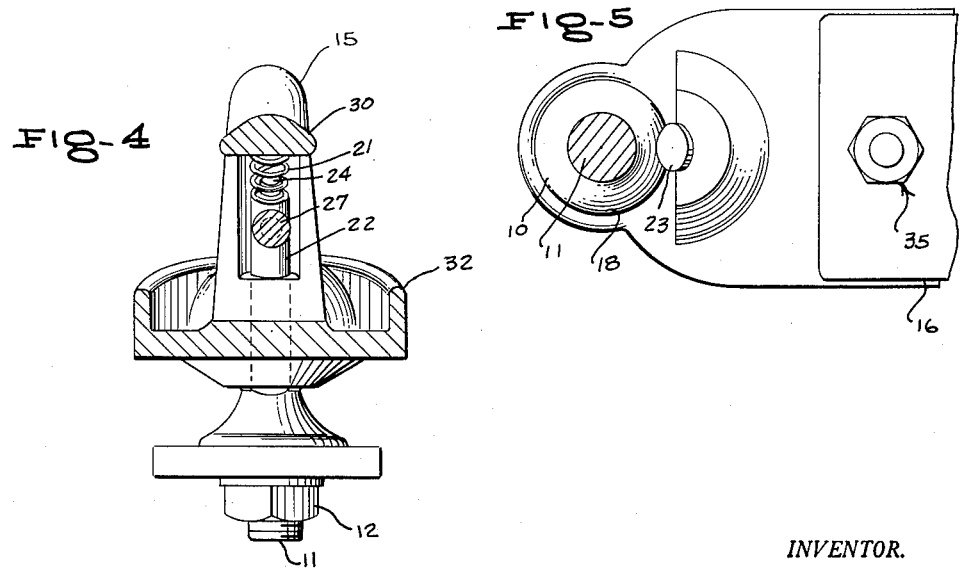
INVENTOR.
ROBERT E. DEEBEL
BY
McMorrow, Berman + Davidson
ATTORNEYS

United States Patent Office 2,732,224
Patented Jan. 24, 1956

2,732,224

SELF LATCHING BALL AND SOCKET TYPE COUPLING

Robert E. Deebel, Torrance, Calif.

Application April 29, 1955, Serial No. 504,831

3 Claims. (Cl. 280—513)

The present invention relates to a trailer hitch assembly and in particular to a trailer hitch assembly which is self-latching.

The primary object of the present invention is to provide a trailer hitch assembly which automatically latches and locks together without manual operation of any lever, bolt, or other fastening element.

Another object of the present invention is to provide a trailer hitch assembly having a lock and means for simultaneous one-handed operation of the lock while lifting the hitch from its attached position on the tractive vehicle.

A further object of the present invention is to provide a trailer hitch assembly of simple, inexpensive construction having few moving parts and one which positively locks together and cannot become accidentally unlocked.

These and other objects and advantages of the present invention will be fully apparent from the following description when taken in connection with the annexed drawings, in which:

Figure 1 is a side view in elevation of the rear portion of a towing vehicle and the forward portion of a trailer showing the trailer hitch assembly of the present invention installed therebetween, Figure 2 is a top plan view of the trailer hitch of the present invention, Figure 3 is a side elevational view in cross-section of the assembly shown in Figure 2 taken on line 3—3 of Figure 2, Figure 4 is an end view in cross-section taken on line 4—4 of Figure 3, and Figure 5 is a vertical view taken on line 5—5 of Figure 3.

Referring in greater detail to the drawings in which like numerals indicate like parts throughout the several views, the present invention consists in a trailer hitch assembly comprising a ball 10 supported on and secured to the upper end of a threaded shank 11 which is secured by a nut 12 to one end of a rearwardly extending hitch bar 13, the other end of which is attached to a towing vehicle indicated generally by the reference numeral 14 in Figure 1.

An upstanding housing 15 is mounted on the end of a forwardly projecting tongue 16 secured to the front end of a trailer 17. The housing 15 is provided at its forward end with a socket 18 which receives the major portion of the ball 10.

A bore 19 extends upwardly at an angle to the vertical from the lower end of the housing 15 and opens into one wall of the socket 18 and has a closed upper end 20 in which is seated one end of a coil spring 21.

A round plunger 22 is mounted in the bore 19 for reciprocal movement and has its lower end portion 23 projecting into the socket 18 below the center line of the ball 10 and engageable with the ball to prevent its removal from the socket 18. The upper end portion 24 of the plunger 22 is provided with a reduced portion which fits within the other end of the spring 21 and centers that end of the spring in the bore 19. Extending through the plunger 22 adjacent the end portion 24 is an aperture 25 having rounded edges and into which projects one end 26 of an arm 27, the other end 28 of the arm being pivotally connected for swinging movement about a horizontal axis to an upstanding boss 29 on the other end of the housing 15.

The housing 15 is formed with a transversely extending opening providing a handle which extends from the portion of the housing overlying the bore 19 to the boss 29. The major and intermediate portion 31 of the arm 27 extends longitudinally of the handle thus formed within the opening.

An upstanding reinforcing rib 32 extends around the forward portion of the housing 15 on its periphery and a reinforcing web 33 extends from the socket 18 to the portion of the housing including the bore 19. Bolt and nut assemblies 35 secure the base 34 of the housing to the tongue 16.

In use, the one end 23 of the plunger 22 projecting into the socket 18 will be engaged by the ball 10 when the hitch is assembled, the ball 10 pushing the plunger 22 into the bore 19 as it enters the socket 18.

The trailer hitch assembly of the present invention therefore is seen to be self-latching and requires no hand operation to lock it when the two vehicles are brought together. Pressure of the fingers upwardly upon the intermediate portion of the arm 27 will serve to retract the plunger 22 within the bore 19 to release the ball 10 from the socket 18 when desired.

What is claimed is:

1. A trailer hitch assembly comprising a ball, an upstanding housing having a downwardly opening socket at one end thereof adapted to receive said ball, said housing having an opening extending transversely therethrough and providing a handle extending longitudinally of said housing, a plunger mounted within said housing for upwardly and downwardly movement and having its lower end portion projecting into said socket and engageable with said ball to prevent removal of said ball therefrom, and an arm having its intermediate portion disposed within said opening and extending parallel with said handle and having one end pivotally connected to said housing adjacent to the other end thereof for swinging movement upon a horizontal axis, said arm having its other end operatively connected to said plunger adjacent the other end of the latter for effecting movement of said plunger upwardly out of engagement with said ball.

2. A trailer hitch assembly comprising a ball, an upstanding housing having a downwardly opening socket at one end thereof adapted to receive said ball, said housing having an opening extending transversely therethrough and providing a handle extending longitudinally of said housing, a plunger mounted within said housing for upwardly and downwardly movement and having its lower end portion projecting into said socket and engageable with said ball to prevent removal of said ball therefrom, an arm having its intermediate portion disposed within said opening and extending parallel with said handle and having one end pivotally connected to said housing adjacent to the other end thereof for swinging movement upon a horizontal axis, said arm having its other end operatively connected to said plunger adjacent the other end of the latter for effecting movement of said plunger upwardly out of engagement with said ball, and spring means in said housing biasing said plunger to its downward position.

3. A trailer hitch assembly comprising a ball, an upstanding housing having a downwardly opening socket at one end thereof adapted to receive said ball, said housing having an opening extending transversely therethrough and providing a handle extending longitudinally of said housing, said housing having a bore extending upwardly from its lower end and terminating adjacent one end of said handle, a plunger mounted within said bore for upwardly and downwardly movement and having its lower end portion projecting into said socket and engageable with said ball to prevent removal of said ball therefrom, an arm having its intermediate portion disposed in said opening and extending parallel with said handle and having one end pivotally connected to said housing adjacent the other end thereof for swinging movement about a horizontal axis, said arm having its other end operatively connected to said plunger adjacent the upper end of the latter for effecting the movement of said plunger upwardly out of engagement with said ball, and a spring disposed in said bore between said plunger and said housing biasing said plunger to its downward position.

References Cited in the file of this patent

UNITED STATES PATENTS

| | | |
|---|---|---|
| 2,090,113 | Dayton | Aug. 17, 1937 |
| 2,166,208 | Dayton | July 18, 1939 |
| 2,242,153 | Thompson | May 13, 1941 |